S. LORD.
Car Truck.

No. 201,540. Patented March 19, 1878.

Witnesses.
A. Ruppert,
J. G. Mason

Inventor.
Simeon Lord
D. R. Holloway & Co.
Atty

UNITED STATES PATENT OFFICE.

SIMEON LORD, OF ST. LOUIS, MISSOURI.

IMPROVEMENT IN CAR-TRUCKS.

Specification forming part of Letters Patent No. 201,540, dated March 19, 1878; application filed December 14, 1877.

*To all whom it may concern:*

Be it known that I, SIMEON LORD, of St. Louis, in the county of St. Louis and State of Missouri, have invented certain new and useful Improvements in Trucks for Railway-Cars, of which the following is a specification:

The object of this invention is to apply friction-wheels to the axles of railway-cars, so as to diminish the resistance by friction.

My invention consists in the peculiar arrangement of parts, that will appear from the following specification and claims.

Figure 1:
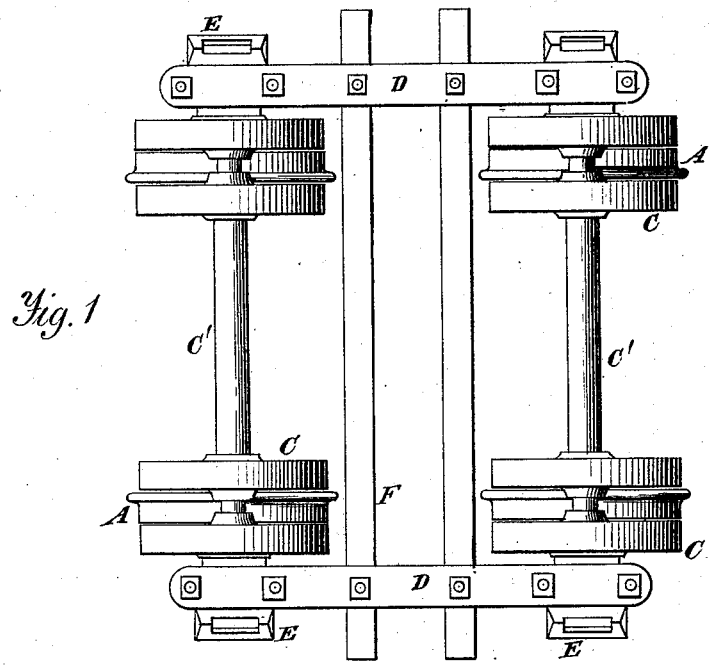
Figure 2:
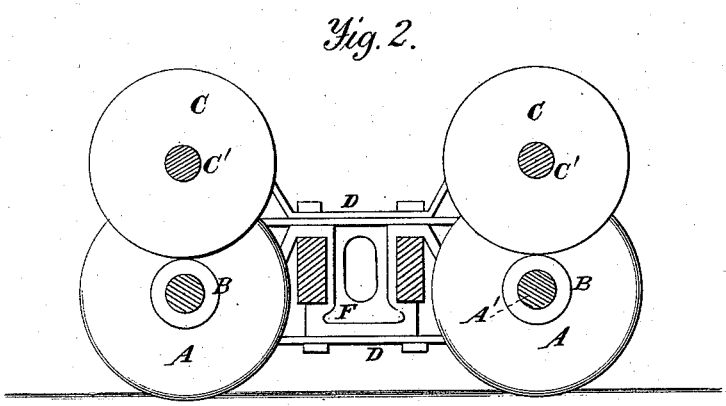
Figure 3:
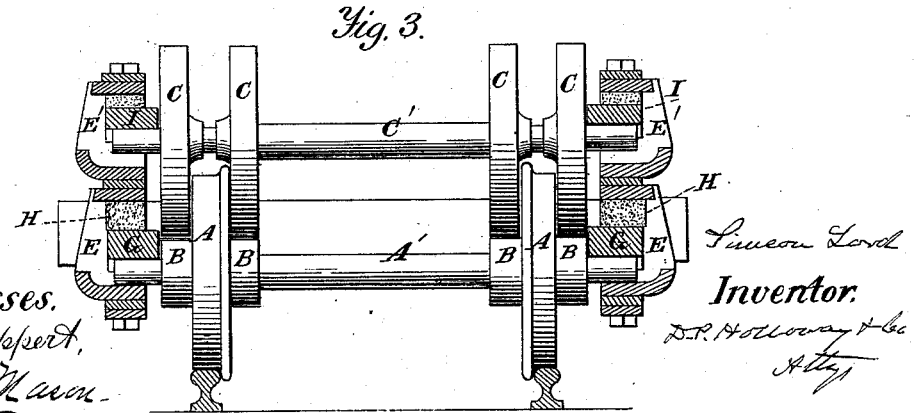

In the annexed drawings, making a part of this specification, Figure 1 is a plan view of a truck. Fig. 2 is a longitudinal section. Fig. 3 is an end elevation, the boxes being represented in section.

The same letters are employed in all the figures in the indication of identical parts.

A A are the wheels, upon the axle of which flat-faced friction-wheels B are placed, on each side of the wheels and close thereto, on which other wheels, C, of, say, three times the diameter of the wheels B, run. These wheels are attached to an axle, C'. The axles A' and C' are extended beyond the wheels A and C, and enter oil-boxes placed over one another, and held in position by the wrought-iron truck-frame D, which is so formed as to embrace both the upper and lower sections of the oil-boxes E E'. The frame also incloses and sustains the ends of the bridge-timber F.

Boxes G G are inclosed in the oil-box E, and rest on top of the axle A'. These boxes are not intended to sustain the weight of the car resting on the axle as that is borne entirely on the steel or chilled-iron friction-wheels; but the boxes G, being strictly confined in place by the oil-boxes, hold the axle A' in fixed relation to and directly under the axle C'. Springs or cushions H are placed on top of the boxes G to hold them in place, and prevent their bouncing out of position when the car is in motion.

The axles C' rest on composition boxes I, placed in the upper oil-boxes E', and sustain the pressure of the load; but as the axle C', in the case hereinbefore supposed, will only revolve once while the axles A' revolve three times, it follows that there will be a proportionate reduction of friction between the axles C' and the boxes I, and consequently they will last three times as long.

By placing the bearing-wheels on each side of the wheels A A, and close to the sides thereof, the greatest possible strength will be given to the axle, and a correspondingly-increased capacity to resist sudden shock. In this case I have illustrated the axles as supported upon a single set of reducing-wheels; but the number may be increased.

I have shown, in another application filed simultaneously with this, a train made up of three sets of friction-wheels.

What I claim as my invention, and desire to secure by Letters Patent, is—

1. In combination with the wheels of a railway-car and the axles thereof, friction-wheels B B and C C, the former being placed close to and on each side of the car-wheels, so as to form at each wheel a double bearing for the support of the load, substantially as set forth.

2. Combination of the wheels A, and axles A', and friction-wheels, for supporting the car independently of the journals of said axle, the oil-boxes E, and journal-boxes G', and cushion or spring H, for confining the axle in position, substantially as set forth.

In testimony whereof I have signed my name to this specification in the presence of two subscribing witnesses.

SIMEON LORD.

Witnesses:
LUCIEN M. CHIPLEY,
WARREN BRUCE.